(12) United States Patent
Cluet et al.

(10) Patent No.: US 12,139,056 B2
(45) Date of Patent: Nov. 12, 2024

(54) VEHICLE SEAT ASSEMBLY AND ASSOCIATED ASSEMBLY METHOD

(71) Applicant: Faurecia Sièges d'Automobile, Nanterre (FR)

(72) Inventors: Mathieu Cluet, Etampes (FR); Jerome Planson, Angerville (FR); Fabrice Charras, Montrouge (FR); Vincent Leguernic, Etrechy (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/747,848

(22) Filed: May 18, 2022

(65) Prior Publication Data

US 2022/0371486 A1 Nov. 24, 2022

(30) Foreign Application Priority Data

May 18, 2021 (FR) .................. FR 21 05169

(51) Int. Cl.
*B60N 2/52* (2006.01)
*B60N 2/50* (2006.01)

(52) U.S. Cl.
CPC ............. *B60N 2/525* (2013.01); *B60N 2/502* (2013.01)

(58) Field of Classification Search
CPC ................................ B60N 2/525; B60N 2/502
See application file for complete search history.

(56) References Cited

U.S. PATENT DOCUMENTS

2021/0276464 A1\* 9/2021 Won ..................... B60N 2/5657

FOREIGN PATENT DOCUMENTS

| DE | 202007008310 U1 | 10/2008 | |
| DE | 102010045899 B3 | 2/2012 | |
| JP | H0482511 A | 3/1992 | |
| KR | 101525765 B1 \* | 6/2015 | ............. B60N 2/565 |
| KR | 102183196 B1 | 11/2020 | |

OTHER PUBLICATIONS

French Search Report corresponding to French Application No. FR 2105169, dated Nov. 25, 2021, 2 pages.

\* cited by examiner

*Primary Examiner* — Anthony D Barfield
(74) *Attorney, Agent, or Firm* — Reising Ethington P.C.

(57) ABSTRACT

An assembly for a vehicle seat that includes: a support element defining a through opening, a padding element attached at least in part to the support element, and a ventilation system assembled to the support element in fluidic communication with the through opening. An inner surface of the support element and/or an inner surface of the padding element define at least one groove. An inner surface of the groove, the inner surface of the support element, and an inner surface of the padding element define an internal volume there between in fluidic communication with the through opening.

9 Claims, 8 Drawing Sheets

VEHICLE SEAT ASSEMBLY AND ASSOCIATED ASSEMBLY METHOD

TECHNICAL FIELD

The present invention relates, according to a first aspect, to a vehicle seat assembly comprising:
- a support element comprising an outer surface and an inner surface, opposite the outer surface, the support element defining an opening through the inner surface to the outer surface,
- a padding element including an inner surface, said inner surface being attached at least in part to the inner surface of the support element,
- a ventilation system assembled on the support element, the ventilation system comprising at least one ventilation duct and being able to blow and/or draw a volume of air through said ventilation duct, the ventilation duct being in fluidic communication with the through opening of the support element.

According to a second aspect, the invention relates to a method of mounting such an assembly.

Finally, according to a third aspect, the invention also relates to a vehicle seat comprising at least one such assembly.

The vehicle seat assembly is, for example, a seat cushion or a backrest intended to receive a vehicle passenger.

The ventilation system provides comfort of the passenger by blowing or drawing in a volume of air, for example heated or cooled.

BACKGROUND

The fabrication of this type of assembly is generally long and tedious because many components are necessary to make the various elements of the assembly cooperate. In addition, these components add weight to the vehicle seat assembly.

One objective of the invention is to overcome these disadvantages by offering a vehicle seat assembly that facilitates its fabrication while allowing good ventilation of the padding element.

SUMMARY

To this end, the invention relates to a vehicle seat assembly of the aforementioned type in which the inner surface of the support element and/or the inner surface of the padding element define at least one groove, wherein an inner surface of the groove, the inner surface of the support element, and the inner surface of the padding element define there between an internal volume in fluidic communication with the through opening.

Thus, fabrication is facilitated since it is the inner surfaces of the support and padding elements that define the internal volume in which the volume of air blown or sucked by the ventilation system circulates. There is no need for additional mounting elements to perform this function. In addition, the fact that the inner surface of the padding element is directly in fluidic contact with the internal volume and the ventilation duct of the ventilation system improves the flow of air from the internal volume to the interior of the padding element and vice versa.

According to different embodiments, the assembly further comprises one or more of the following features, taken alone or in any technically possible combination:
- the internal volume is completely defined by the inner surface of the groove, the inner surface of the support element and the inner surface of the padding element, with the volume of air blown and/or sucked in by the ventilation system flowing through the internal volume;
- the assembly further comprises an intermediate attachment ring received in the through opening, the ventilation system cooperating with the intermediate attachment ring;
- the intermediate attachment ring comprises part of a bayonet fastening system able to attach the ventilation system to the intermediate attachment ring;
- the intermediate attachment ring covers an inner wall of the through opening;
- the inner surface of the support element extends according to a first direction of extension, said inner surface presenting a dimension according to said first direction of extension, the groove extending according to a second direction substantially parallel to the first direction of extension and presenting a dimension in the second direction of extension at least equal to 50% of the dimension of the inner surface;
- the inner surface of the support element defines at least two grooves arranged on either side of the through opening;
- the support element comprises at least one deflection element arranged inside the groove, the deflection element being intended to deflect an air flow in the internal volume and to form a support element for the padding element resting against the inner surface of said padding element.

The invention also relates, according to a second aspect, to a method of fabricating a vehicle seat assembly as described above, the method comprising the following steps:
- assembling the ventilation system onto the support element, the ventilation duct being in fluid communication with the through opening of the support element, and
- attaching the inner surface of the padding element to at least a portion of the inner surface of the support element,
  the inner surface of the groove, the inner surface of the support element, and the inner surface of the padding element defining there between an internal volume in fluidic communication with the through opening.

According to a particular embodiment, the method further comprises a step of inserting an intermediate attachment ring into the through opening, the ventilation system cooperating with the intermediate attachment ring.

According to a third aspect, the invention relates to a vehicle seat comprising at least one assembly as described above.

BRIEF DESCRIPTION OF THE DRAWINGS

Other aspects and advantages of the invention will become apparent from the following description, which is given by way of example and made with reference to the attached drawings, among which.

DETAILED DESCRIPTION OF EMBODIMENTS

Figure 1:
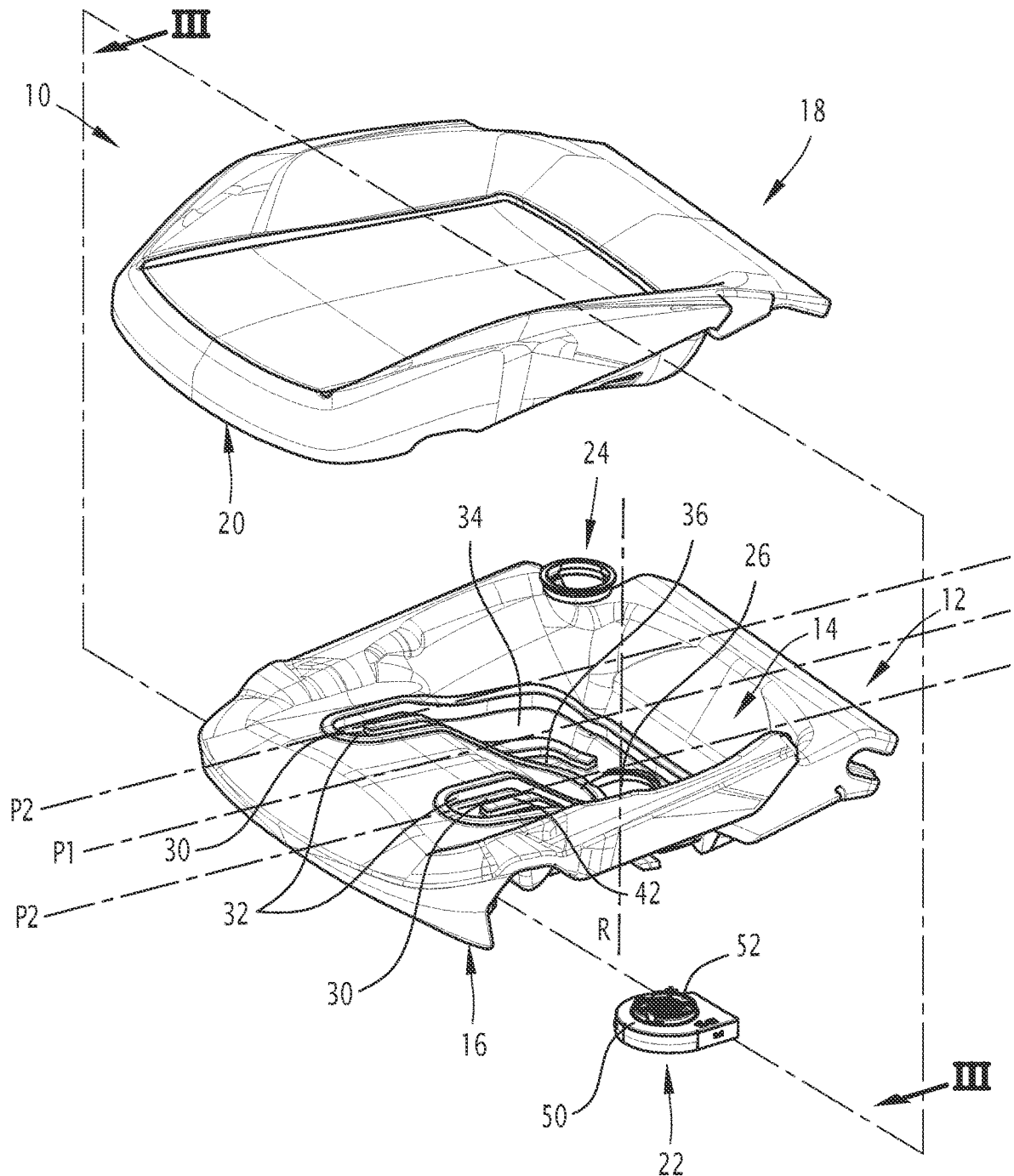
FIG. 1 is an exploded perspective representation of an assembly according to an embodiment of the invention.

FIG. 1 is an exploded perspective representation of a vehicle seat assembly 10 according to an embodiment of the invention.

In the example described, the assembly 10 is a vehicle seat cushion.

Alternatively, the assembly 10 is a vehicle seat backrest.

The assembly 10 comprises a support element 12 comprising an inner surface 14 and an outer surface 16, opposite the inner surface 14. The assembly 10 further comprises a padding element 18 comprising an inner surface 20 attached at least in part to the inner surface 14 of the support element 12. The assembly 10 further comprises a ventilation system 22. Preferably, the assembly 10 further comprises an intermediate attachment ring 24.

In the case of a seat cushion, the outer surface 16 of the support element 12 is intended to face a vehicle floor (not shown).

The support element 12 is, for example, made of a polymeric material, such as polyethylene. Preferably, the support element 12 is obtained by molding.

The inner surface 14 of the support element 12 extends according to a first extension direction P1. The inner surface 14 presents a dimension d1 according to the extension direction P1.

The support element 12 defines a through opening 26 from the inner surface 14 to the outer surface 16. Preferably, the through opening 26 defines a substantially cylindrical inner wall 28 with a circular base having an axis R substantially perpendicular locally to the inner surface 14 of the support element 12. By locally, it is meant that the axis R is substantially perpendicular to the inner surface 14 at least at the location of the inner surface where the through opening 26 is formed.

Figure 2:
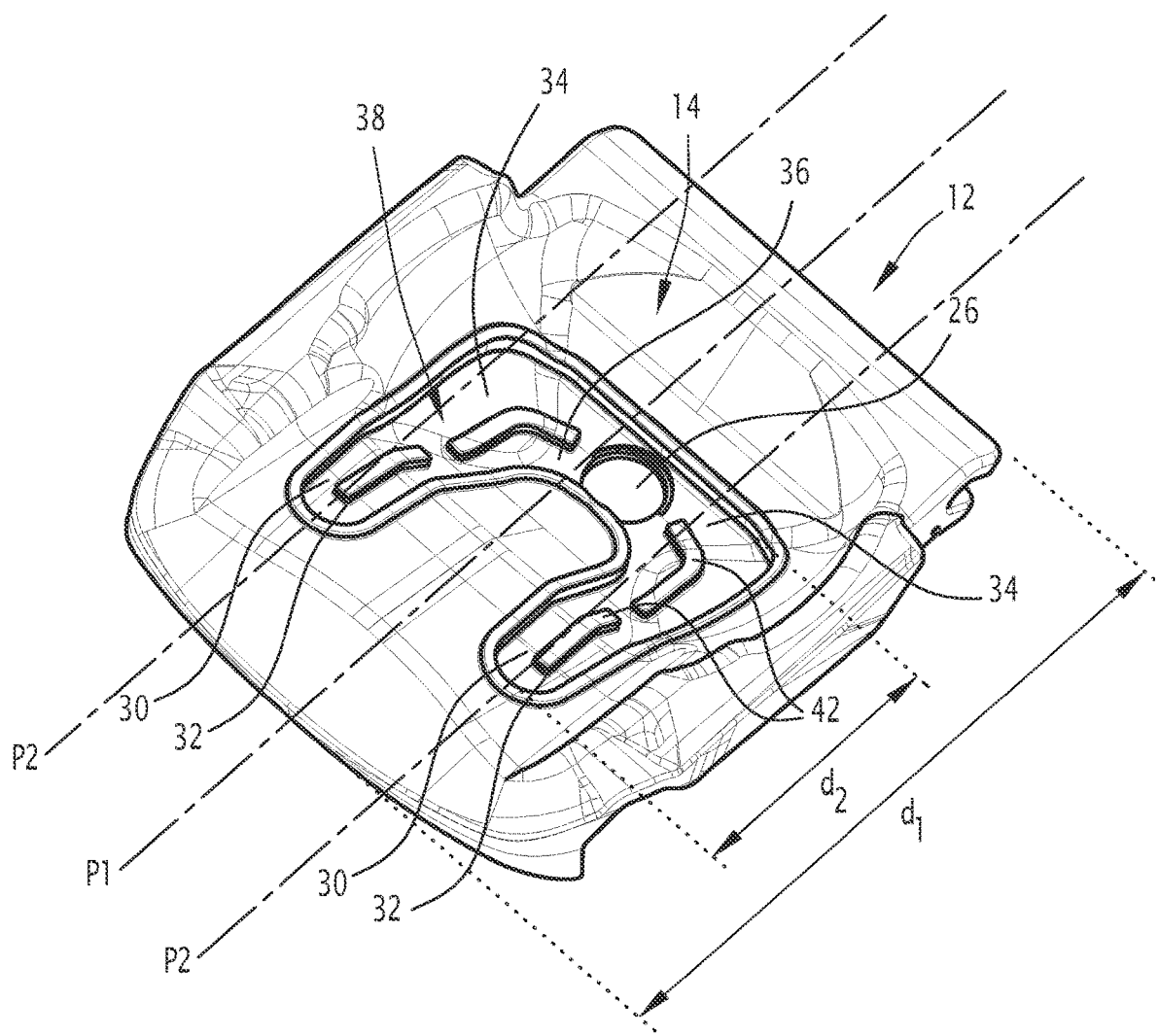
FIG. 2 is a top view of the support element of the assembly of FIG. 1.

The inner surface 14 of the support element further defines at least one groove 30 visible in particular in FIGS. 1 and 2. In the example shown, the inner surface 14 of the support element 12 defines two grooves 30 arranged on either side of the through opening 26. Each groove 30 extends principally according to an extension direction P2 from a first end 32 towards a second end 34. The second ends 34 of the two grooves 30 are connected to each other. The grooves 30 form between them a recess 36 in the support element 12 connected to the through opening 26. By connected to the through opening 26 is meant that the through opening 26 opens into the recess 36 on the side of the inner surface 14.

The direction of extension P2 of each of the grooves 30 is substantially parallel to the direction of extension of the inner surface 14 of the support element 12. Each groove 30 presents a dimension $d_2$ according to the extension direction P2 at least equal to 50% of the dimension $d_1$ of the inner surface 14, preferably between 50% and 90% of the dimension $d_1$ of the inner surface 14, advantageously between 70% and 90% of the dimension $d_1$ of the inner surface 14. Thus, the groove 30 extends over a substantial portion of the interior surface 14 of the support element 12, thereby providing ventilation over a substantial region of the inner surface 20 of the padding element 18.

An inner surface 38 of each of the grooves 30, the inner surface 14 of the support element 12 around the grooves 30, and the inner surface 20 of the padding element 18 define an inner volume 40 there between in fluid communication with the through opening 26. The internal volume 40 is completely defined by the inner surface 38 of the groove 30, the inner surface 14 of the support element 12, and the inner surface 20 of the padding element 18, with the volume of air blown and/or drawn in by the ventilation system 22 flowing through the internal volume 40, i.e., no additional elements are needed to delineate the internal volume 40. Stated differently, the internal volume 40 is defined solely by the inner surface 38 of the groove 30, the inner surface 14 of the support element 12, and the inner surface 20 of the padding element 18. This facilitates the fabrication and construction of the assembly 10.

Preferably, at least one groove 30 comprises at least one deflection element 42 arranged within the groove 30. The deflection element 42 is intended to hold the padding element 18 and prevent said element 18 from collapsing thereby reducing the internal volume 40. Such a deflection element 42 is, for example, formed by a wall extending from the inner surface 38 of the groove in a portion of the groove.

The inner surface 20 of the padding element 18 is, for example, secured by mechanical fasteners and/or by adhesive bonding (not shown) to at least a portion of the inner surface 14 of the support element 12.

Figure 3:
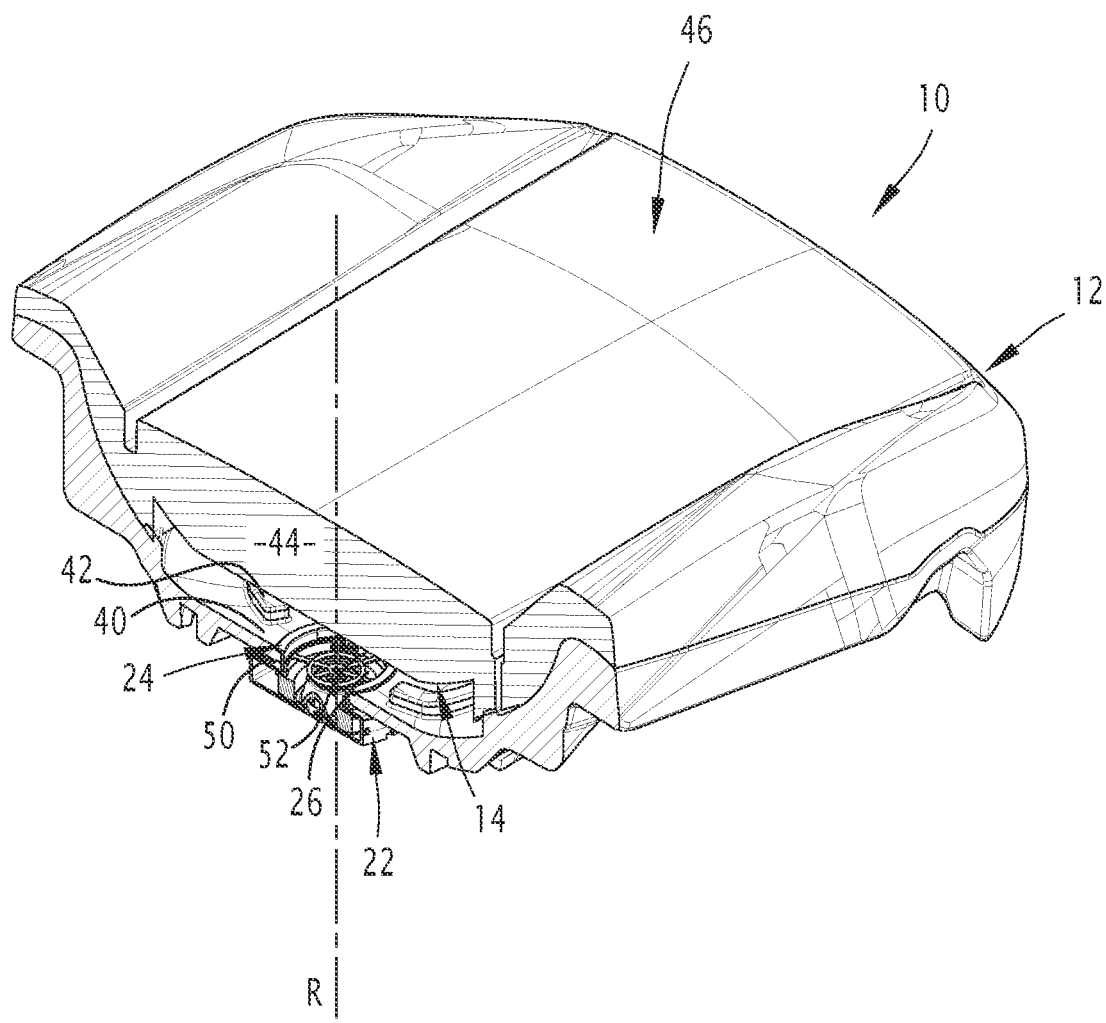
FIG. 3 is a cross section of the assembly of FIG. 1.

The padding element 18 (FIG. 3) includes, for example, an inner layer 44 of material surrounded, at least at an outer surface 46 of the padding element 18, by a padding layer 48. The outer surface 46 is intended to receive the passenger, i.e., the passenger rests on at least part of the outer surface 46 when sitting in the seat.

The inner layer 44 of material is, for example, a soft synthetic foam layer to provide comfort to the passenger.

The padding layer 48 is, for example, fabric, skin, such as perforated natural or synthetic leather, or any other breathable material.

The ventilation system 22 is assembled on the support element 12.

The ventilation system 22 is able to blow and/or draw a volume of air into/from the internal volume 40. The ventilation system 22 comprises, for example, a housing 50 and an impeller (not shown) able to rotate a plurality of blades to circulate air within the housing 50.

The ventilation system 22 comprises at least one air duct in fluidic communication with the through opening 26 of the support element.

The ventilation duct is preferably substantially rotationally cylindrical. The ventilation duct 52 extends from a face of the housing 50 towards the through opening 26. Preferably, the ventilation duct 52 is received within the through opening 26, but does not pass through the through opening 26, i.e., it does not extend into the internal volume 40.

Preferably, the intermediate attachment ring 24 is received in the through opening 26. The intermediate attachment ring 24 cooperates with the ventilation system 22, and more particularly with the ventilation duct 52. The intermediate attachment ring 24 facilitates the fixing of the ventilation system 22 to the support element 12.

The intermediate attachment ring 24 has a substantially tubular shape. The intermediate attachment ring 24 comprises a side wall 54 covering the inner wall 28 of the through opening 26.

Figure 4:
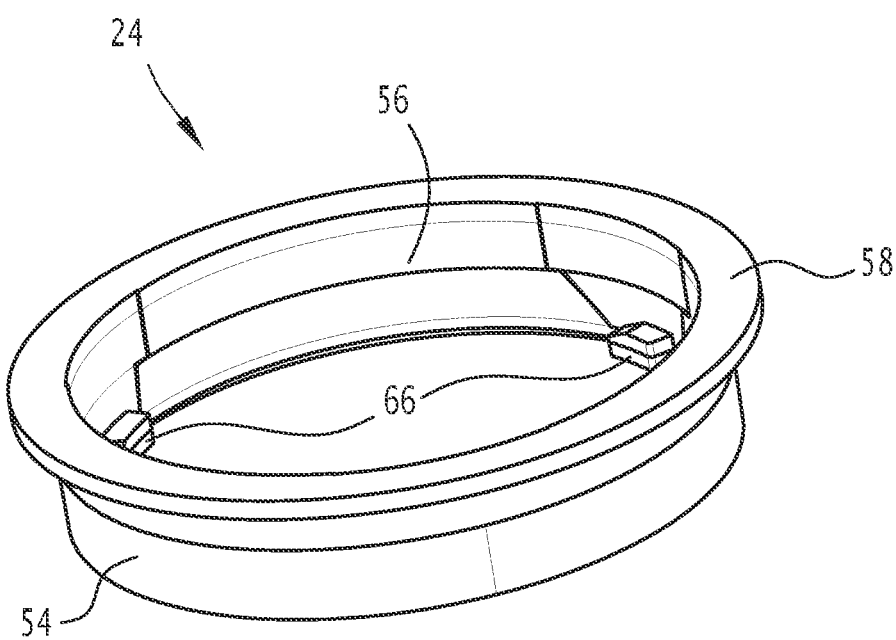
FIG. 4 is a perspective view of the intermediate attachment ring of the assembly of FIG. 1.

The intermediate attachment ring 24 further comprises an inner end 56 connected to the side wall 54 and received within the internal volume 40 in abutment with the inner surface 14 of the support element 12, on a periphery of the through opening 26. The inner end 56 comprises, for example, a support collar 58 (FIG. 4) arranged on a periphery of the intermediate attachment ring 24 and extending radially towards the periphery of the through opening 26. The support collar 58 rests on the inner surface 14 of the support element 12, around the through opening 26.

Alternatively, the inner end 56 comprises a plurality of support elements (not shown) extending radially towards the periphery of the through opening 26.

The ventilation duct 52 mechanically cooperates with the intermediate attachment ring 24.

For this purpose, the intermediate attachment ring 24 comprises, for example, a part 60 of a bayonet fastening system 62 able to fasten the ventilation system 22 to the intermediate attachment ring 24. The sidewall 54 of the ventilation duct 52 comprises a complementary portion 63 of the bayonet fastening system 62 able to secure the ventilation system 22 to the intermediate attachment ring 24.

Figure 5:
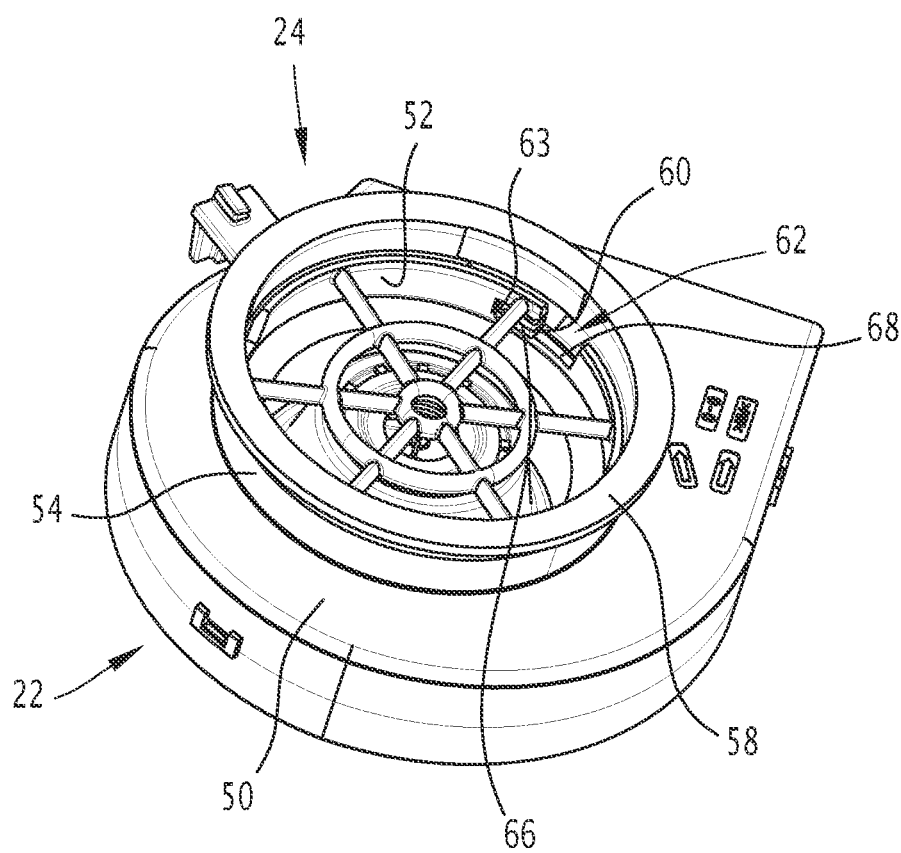
FIG. 5 is a perspective view of the intermediate attachment ring and ventilation system of the assembly of FIG. 1, and FIGS. 6 through 8 are schematic representations of the steps for assembling the ventilation system to the support element of the assembly of FIG. 1.

For example, as further illustrated in detail in FIG. 5, an inner surface 64 of the intermediate attachment ring 24 comprises at least two lugs 66 received in two corresponding housings 68 defined by the side wall 54 of the ventilation duct 52.

In one embodiment wherein the ventilation system 22 is able to draw a volume of air into the internal volume 40, the housing 50 further comprises at least one air outlet in fluidic communication with ambient air. Thus, air is expelled from the internal volume 50 through the air outlet.

In one embodiment wherein the ventilation system 22 is adapted to blow a volume of air into the internal volume 40, the housing 50 further comprises at least one air inlet in fluidic communication with ambient air, i.e., with air present in the passenger compartment. The air is thus drawn in through the air inlet inside the housing 50 of the ventilation system 22 and then blown into the internal volume 40 through the ventilation duct 52.

Additionally, the ventilation system 22 may comprise a heating and/or cooling device (not shown) able to respectively heat and/or cool the air before being blown into the internal volume 40.

Figure 6:
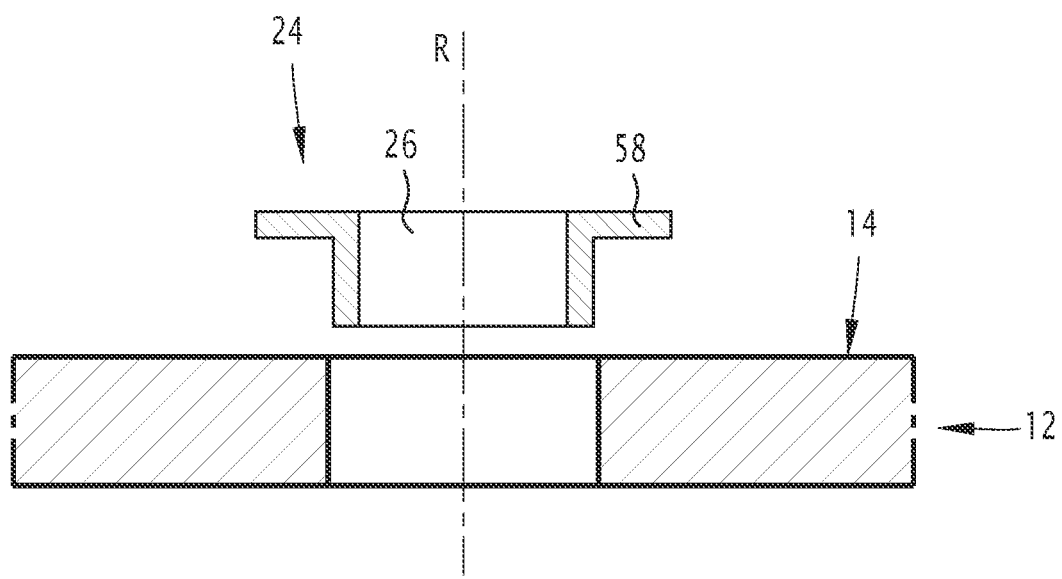
Figure 7:
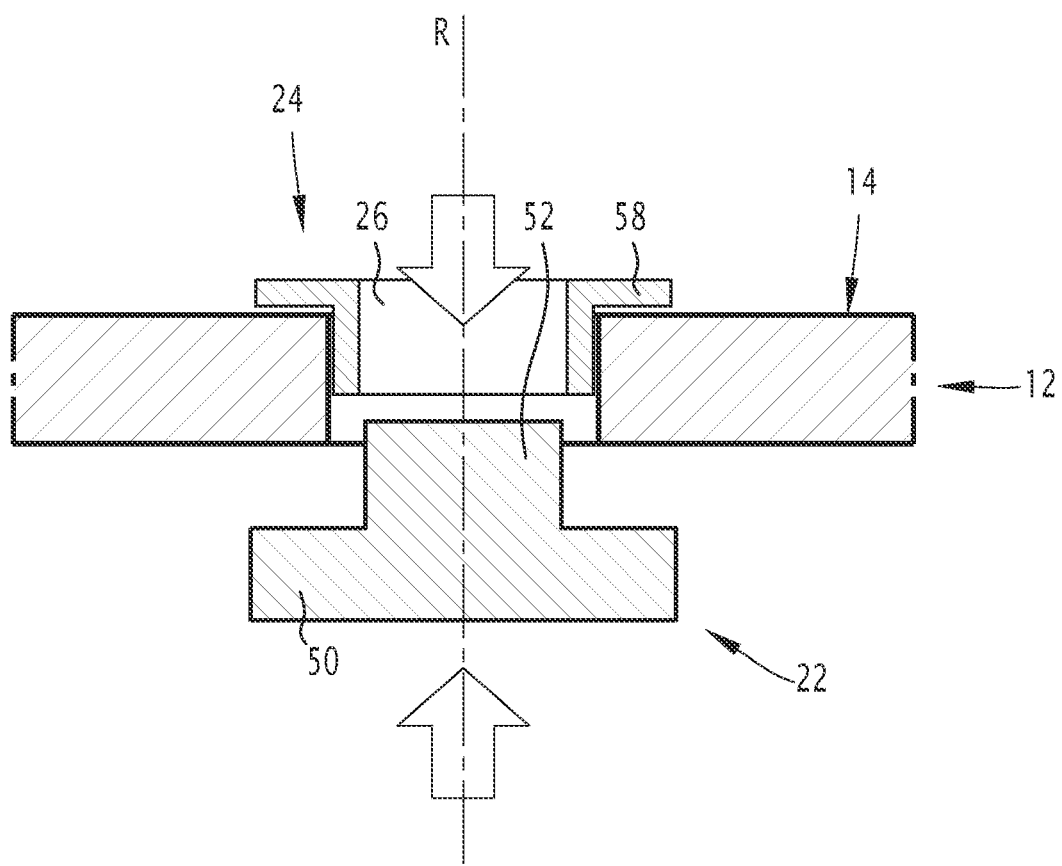
Figure 8:
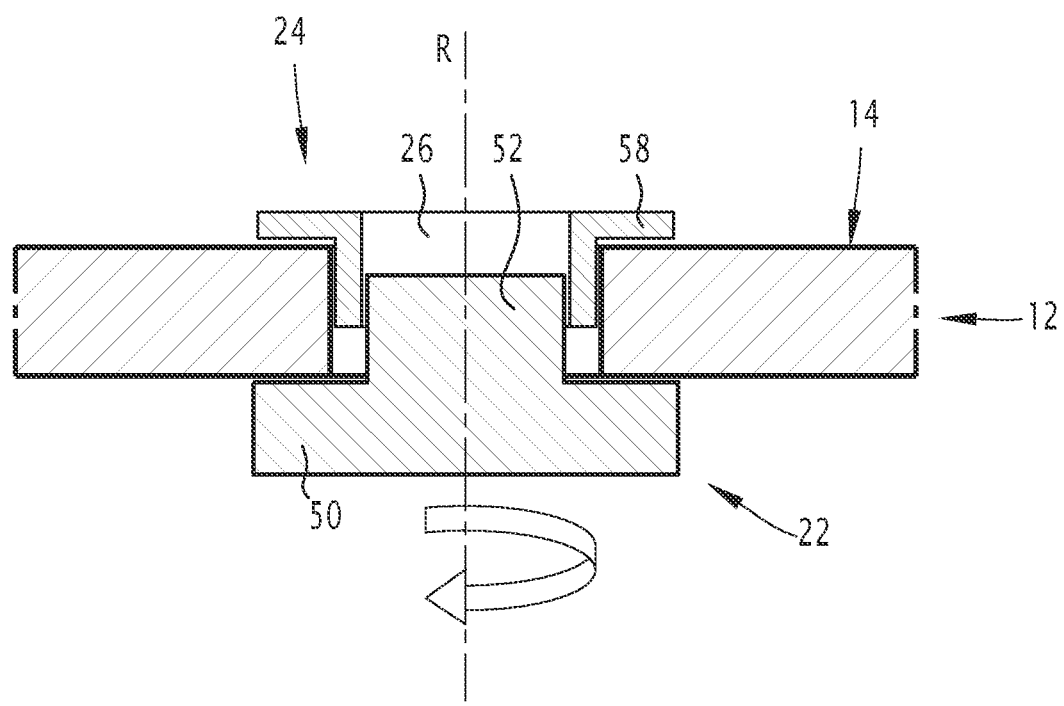

A method of manufacturing a vehicle seat assembly 10 will now be described with particular reference to FIGS. 6 through 8.

The method first comprises mounting the ventilation system 22 onto the support element 12.

For this purpose, preferably, the intermediate attachment ring 24 is inserted into the through opening 26 from the inner surface 14 of the support element 12 so that the intermediate attachment ring 24 covers the inner wall 28 of the through opening 26. The support collar 58 of the intermediate attachment ring 24 is positioned in abutment with the inner surface 14 of the support element 12 around the periphery of the through opening 26.

The ventilation system 22 is then inserted into the interior of the through opening 26, and more particularly into the interior of the intermediate attachment ring 24 by a translational movement along the axis R of the through opening 26.

The part 60 of the bayonet fastening system 62 of the intermediate attachment ring 24 then cooperates with the complementary part 63 of the bayonet fastening system 62 of the ventilation system 22. In particular, the lugs 66 of the intermediate attachment ring 24 are received in the housings 68 of the ventilation system 22. A rotational movement about the axis R allows a locking of each of the lugs 66 in the respective housings 68.

The method then comprises a step of securing the inner surface 20 of the padding element 18 to at least a portion of the inner surface 14 of the support element 12. The inner surface 38 of the groove 30, the inner surface 14 of the support element 12, and the inner surface 20 of the padding element 18 then define between them the internal volume 40 in fluidic communication with the through opening 26.

Thus, the vehicle seat assembly 10 is particularly advantageous. Indeed, manufacture of the assembly 10 is facilitated since it is the inner surfaces 14, 20 of the support elements 12 and padding 18 that define the internal volume 40 wherein the volume of air blown or sucked in by the ventilation system 22 circulates, without the need for additional elements. Furthermore, having the inner surface 20 of the padding element 18 in fluidic contact with the internal volume 40 and the ventilation duct 52 of the ventilation system 22 enhances the flow of air from the internal volume 40 to the interior of the padding element 18 and vice versa.

The invention claimed is:

1. A vehicle seat assembly comprising:
   a support element comprising an outer surface and an inner surface, opposite the outer surface, the support element defining a through opening from the inner surface to the outer surface,
   a padding element having an inner surface, said inner surface being attached at least in part to the inner surface of the support element, the padding element comprising an outer surface for receiving the passenger when seated on the seat, the padding element being located above the support element covering the support element,
   a ventilation system assembled on the support element, the ventilation system comprising at least one ventilation duct and being able to blow and/or draw a volume of air through said ventilation duct, the ventilation duct being in fluidic communication with the through opening of the support element, and
   an intermediate attachment ring received in the through opening, the ventilation system cooperating with the intermediate attachment ring, the ventilation system being inserted in contact with and inside the intermediate attachment ring,
   wherein the inner surface of the support element defines at least one groove,
   an inner surface of the groove, the inner surface of the support element and the inner surface of the padding element defining therebetween an internal volume in fluidic communication with the through opening.

2. The assembly according to claim 1, wherein the internal volume is completely defined by the inner surface of the groove, the inner surface of the support element, and the inner surface of the padding element, the volume of air blown and/or sucked in by the ventilation system flowing through the internal volume.

3. The assembly according to claim 1, wherein the intermediate attachment ring comprises a portion of a bayonet fastening system able to attach the ventilation system to the intermediate attachment ring.

4. The assembly according to claim 1, wherein the intermediate attachment ring covers an inner wall of the through opening.

5. The assembly according to claim 1, wherein the inner surface of the support element extends according to a first direction of extension, said inner surface presenting a dimension according to said first direction of extension, the groove extending according to a second direction parallel to the first direction of extension and presenting a dimension in the second direction of extension at least equal to 50% of the dimension of the inner surface.

6. The assembly according to claim 1, wherein the inner surface of the support element defines at least two grooves arranged on either side of the through opening.

7. The assembly according to claim 1, wherein the support element comprises at least one deflection element arranged inside the groove, the deflection element being intended to deflect an air flow into the internal volume and to form a support element for the padding element resting against the inner surface of said padding element.

8. A vehicle seat comprising at least one assembly according to claim 1.

9. A method of mounting an assembly for a vehicle seat, the assembly comprising:
   a support element including an outer surface and an inner surface opposite the outer surface, the support element defining a through opening from the inner surface to the outer surface,
   a padding element including an inner surface, the padding element comprising an outer surface for receiving the passenger when seated on the seat, the padding element being located above the support element covering the support element, and
   a ventilation system comprising at least one ventilation duct, the ventilation system being adapted to blow and/or draw a volume of air through said ventilation duct,
   the inner surface of the support element defining at least one groove,
   the method comprising the following steps:
   assembling the ventilation system onto the support element with the ventilation duct in fluidic communication with the through opening of the support element, and
   attaching the inner surface of the padding element to at least one portion of the inner surface of the support element, and
   inserting an intermediate attachment ring into the through opening, the ventilation system cooperating with the intermediate attachment ring, the ventilation system being inserted in contact with and inside the intermediate attachment ring,
   the inner surface of the groove, the inner surface of the support element, and the inner surface of the padding element defining therebetween an internal volume in fluidic communication with the through opening.

* * * * *